Nov. 19, 1929.　　　G. W. BRUCE　　　1,735,993
POTATO DIGGER
Filed Aug. 19, 1927
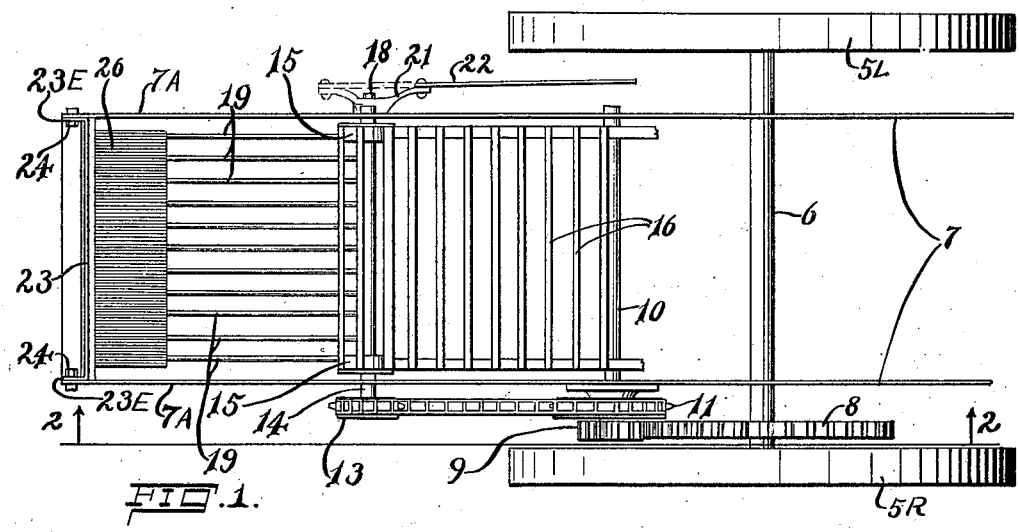
FIG. 1.
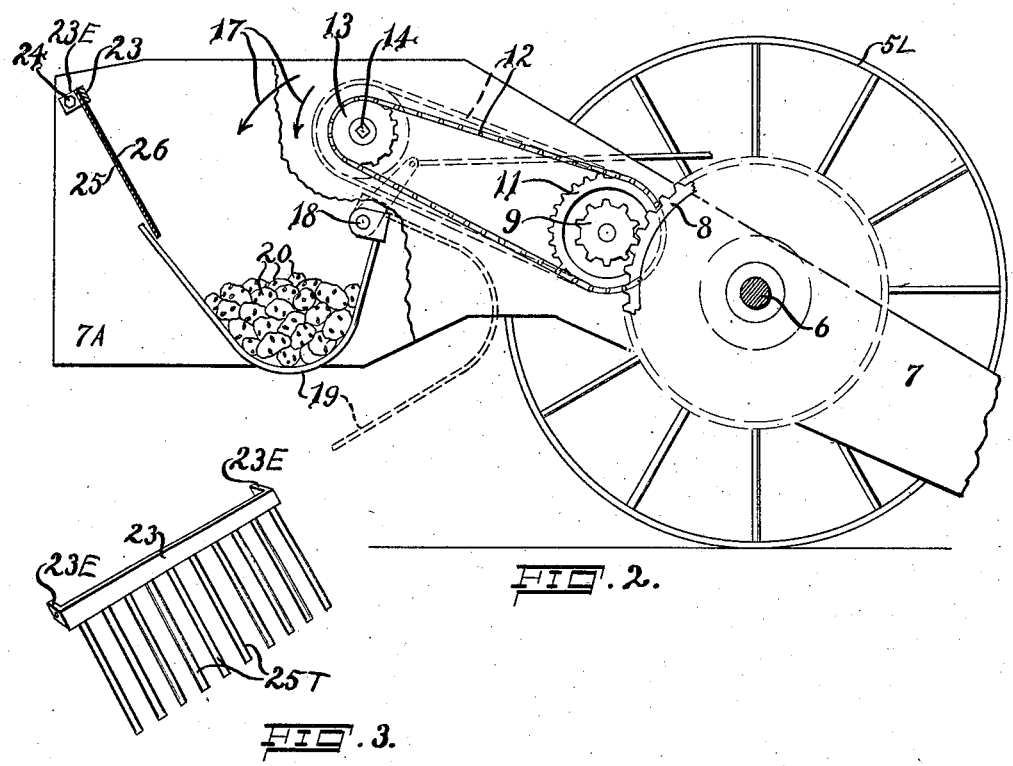
FIG. 2.
FIG. 3.
INVENTOR:
George W. Bruce
BY David E. Carlsen
ATTORNEY.

Patented Nov. 19, 1929

1,735,993

UNITED STATES PATENT OFFICE

GEORGE W. BRUCE, OF OSSEO, MINNESOTA, ASSIGNOR TO THE BRUCE MANUFACTURING COMPANY, OF MINNEAPOLIS, MINNESOTA.

POTATO DIGGER

Application filed August 19, 1927. Serial No. 214,105.

My invention relates to improvements in potato harvesting machines. The general object is to further simplify, improve and increase the efficiency of potato harvesters on which patents were granted to me on March 4, 1919 and September 1, 1925, Patent Numbers 1,296,475 and 1,551,795 respectively. Further objects and advantages will appear in the following specification, reference being had to the accompanying drawing, in which,—

Fig. 1 is a top view of the rear portion of a potato digger embodying my new improvements.

Fig. 2 is a partly sectional side elevation about as at line 2—2 in Fig. 1.

Fig. 3 is a perspective view of a modified form of potato guide board which may be used in place of the guide 25—26 shown in Figs. 1 and 2.

Referring to the drawing by reference numerals, 5R and 5L designate respectively the right and left bull wheels of a potato digger on the main axle 6 suitably supporting the parallel main frame members 7 of a potato digger said latter members being enlarged rearwardly to form two opposite, vertical walls 7A. 8 is a bull gear rotated by the movement of the ground wheels to drive a pinion 9 on a drive shaft 10 suitably mounted transversely in the main frame. 11 is a primary chain drive sprocket also keyed on shaft 10 and drives a rearwardly extending chain 12 engaging a sprocket 13 removably fixed on the outer end of a countershaft 14 mounted transversely in the upper part of the frame parts 7A. Said countershaft carries suitable sprockets 15 or equivalent means engaging and driving the potato conveyor 16 extending forwardly and downwardly to the usual well known potato digging means (not shown) of a potato digger. The upper run of the conveyor, of course, moves rearwardly and the potatoes are dropped at the rear end between walls 7A as indicated by the arrows 17.

It is one object of this invention to provide with each machine several sizes of sprockets 13 and chain 12 of the removable link type.

It is obvious that the larger the sprocket 13 the slower the conveyor will move and the smaller the sprocket 13, the faster the conveyor will move, a large type of sprocket 13 being indicated dotted in Fig. 2. Hitherto potato diggers have been constructed to provide only one conveyor speed but I have found that better results are obtained by providing for variable speeds of the conveyor according to various conditions such as the condition of soil, potato vines, and moisture in the soil. For example, for heavy moist soil it may be best to use a small sprocket 13 causing a slow movement of the conveyor and relatively more time and shaking of the conveyor by the usual well known means provided therefor, to separate the potatoes from their vines and the soil which would have a tendency to stick to the potatoes.

Below and parallel to shaft 14 I mount rotatably another shaft 18 between the parallel walls 7A and forming the fulcrum of a grate hopper 19 comprising a row of rearwardly extending V-shaped bars serving to catch the potatoes 20 dropped from the rear end of conveyor 16. One end of said shaft protrudes from the side of the frame and carries a lever 21 to which is connected a reach rod 22 extended forward to suitable manipulating means operated by the driver to tilt hopper 19 forward as to dotted line position in Fig. 2 to dump a quantity of potatoes on the ground.

It will be readily understood that when the digger is operating at good speed or the conveyor is moving fast some potatoes may be projected rearwardly beyond the operable zone of the hopper and fall on the ground promiscuously and may subsequently be crushed by the drive wheels, the horses hoofs or the wheels of a tractor. To prevent this and insure proper catching of all the potatoes in the hopper I provide an angularly mounted apron or guide at the rear of the frame. Said apron comprises preferably a transverse horizontal bar 23 with short end lugs 23E at right angles to the main body of the bar and each said end 23A apertured for a bolt 24 to secure it to the adjacent side plate 7A. The apron itself comprises, as in Figs. 1 and 2, preferably a quadrangular spring steel plate 25 fixed with its upper edge part to said bar 23 and extends normally forwardly and downwardly in an inclined plane with its lower edge just within and above the free ends of the hopper bars 19 when said hopper is in the receiving position. The front face of this plate is preferably covered with a sheet of corrugated rubber 26. It is evident that this guard will guide all potatoes striking it downwardly into the hopper. The guide plate being fixed only at its upper edge its main body will yield when potatoes are thrown against it and the rubber surface minimizes the danger of bruising the potatoes.

In Fig. 3 is shown an alternative type of yieldable guide comprising the bar 23 and the apron part comprising a row of spring metal teeth 25T fixed in bar 23 and projecting downwardly therefrom in a common plane corresponding to the plane of apron 25 in Figs. 1 and 2.

I claim:

1. In a potato harvester having an elongated wheel supported conveyor frame, a potato conveyor comprising an endless belt in said frame and movable longitudinally therein, the rear part of said frame comprising two vertical and parallel walls and a conveyor drive shaft mounted in said frame; a potato hopper pivotally mounted below the rear end of said conveyor and means for tilting said hopper forwardly on its pivot to discharge potatoes downwardly and rearwardly; a forwardly and downwardly inclined guide fixed between the said walls rearward of and above the said hopper to guide potatoes into the latter.

2. The structure specified in claim 1 in which said hopper comprises an oscillatable transverse shaft, a series of parallel bars bent in V-shape and fixed with their forward ends to said shaft and their free rear ends normally projecting rearwardly and upwardly in proximity to the lower part of said inclined guard.

3. The structure specified in claim 1, in which said hopper comprises an oscillatable transverse shaft, a series of parallel bars bent in V-shape and fixed with their forward ends to said shaft, said inclined guard comprising a quadrangular yieldable element, a transverse horizontal bar removably fixed between said vertical walls and the upper horizontal part of said yieldable element fixed thereto, the element extending forwardly and downwardly and terminating with its lower edge adjacent the free ends of said hopper bars.

4. The structure specified in claim 1, and a sheet of soft pliable material fixed on the front face of said guard for the purpose described.

In testimony whereof I affix my signature.

GEORGE W. BRUCE.